United States Patent
Masaki et al.

[11] Patent Number: 5,189,656
[45] Date of Patent: Feb. 23, 1993

[54] CONTROL SYSTEM FOR A COMPACT DISK PLAYER

[75] Inventors: Naoki Masaki; Osamu Hira; Naoki Shimada, all of Tokorozawa, Japan

[73] Assignee: Pioneer Electronic Corporation, Tokyo, Japan

[21] Appl. No.: 847,882

[22] Filed: Mar. 10, 1992

Related U.S. Application Data

[63] Continuation of Ser. No. 518,925, Sep. 7, 1990, abandoned.

[30] Foreign Application Priority Data

Feb. 28, 1990 [JP]  Japan .................................... 2-48406
Mar. 22, 1990 [JP]  Japan .................................... 2-72909

[51] Int. Cl.⁵ ............................................... G11B 7/00
[52] U.S. Cl. ........................................ 369/47; 369/34; 369/32

[58] Field of Search .................. 369/33, 36, 34, 48, 369/58, 32, 47

[56] References Cited

U.S. PATENT DOCUMENTS

4,706,233  11/1987  d'Alayer de Costemere d'Arc ..................................... 369/34
4,899,326  2/1990  Takeya et al. .......................... 369/36

Primary Examiner—Roy N. Envall, Jr.
Assistant Examiner—Nabil Hindi
Attorney, Agent, or Firm—Nikaido, Marmelstein, Murray & Oram

[57] ABSTRACT

A compact disk player has a magazine containing a plurality of disks. Identification data, about a last disk which has been played before the stop of the playing of the disk, is detected. A memory is provided for storing the detected identification data. The last disk, data of which is stored in the memory, is played at the next time by operating a stop key.

8 Claims, 14 Drawing Sheets

CONTROL SYSTEM FOR A COMPACT DISK PLAYER

This application is a continuation of application Ser. No. 578,925 filed Sep. 7, 1990 now abandoned.

BACKGROUND OF THE INVENTION

The present invention relates to a control system for a compact disk player, and more particularly to a control system for a compact disk player capable of continuously playing a plurality of disks.

Generally, in the compact disk (hereinafter called CD) player, component parts are so arranged as to be disposed in high density in accordance with enhancement of multiplicities of function and source. On the other hand, the mechanism is designed to satisfy the tendency to the enhancement and multiplication of function as well as simplification in construction.

A multifunction CD player capable of continuously playing a plurality of disks contained in a magazine has been provided. A multifunction CD player for automobiles has also been provided.

In such a CD player, when the magazine is set and a CD select key is depressed, the magazine is vertically moved from a first position for a first disk to a selected position for the selected disk. Therefore, the selected disk mounted on a tray in the magazine is drawn from the magazine and carried to a playing position together with the tray and clamped on a turn table. When a play key is depressed, the CD player starts to perform the reproduction of the selected disk. When a stop key is depressed while playing, a pick-up is returned to a home position, and the playing disk is released from the clamp and returned into the magazine. Furthermore, the magazine is returned to the first position.

Since the magazine returns to the first position when the stop key is depressed, the first disk is necessarily played when the play key is re-depressed. If the playing of the last disk at the stopping of the play or of a disk next to the last disk is desired, the select key must be depressed for selecting the last disk. This is troublesome handling.

Furthermore, there is a case where CDs in a magazine which have been played by a home CD player are played by a car CD player in an automobile. If it is desired to play a CD which is the last disk played by the home CD player or the disk next to the last disk, the select key must also be depressed. However, if the CD can not be clearly remembered, the desired CD must be searched by operating the car CD player.

SUMMARY OF THE INVENTION

An object of the present invention is to provided a multifunction CD player in which continuous playing of a disks may be simply carried out without repeatedly playing the same disks.

Another object of the present invention is to provide a CD player which may avoid playing the same music by simple key operation.

A further object of the invention is to provide a control system for a compact disk player having a magazine containing a plurality of disks and operating keys including a start key for starting playing a disk and a stop key for stopping the playing, a detector device for detecting the identification of a last disk which has been played immediately before the stop of the playing the disk due to the operation of the stop key. The detected identification of the last disk is stored in a memory. When a play key is depressed after the stop of the playing, the last disk is played. The identification includes data for the magazine, a CD number and a music number.

In an aspect of the invention, a bar code is provided on the magazine for identifying the magazine, CD and music, and detector device is provided to read the bar code.

In further aspect, a magnetic recording sheet is attached to the magazine and a magnetic head is provided for recording the identification data on the magnetic recording sheet and for reading the recorded data.

The other objects and features of this invention will become understood from the following description with reference to the accompanying drawings.

DETAILED DESCRIPTION OF THE PREFERRED EMBODIMENTS

Figure 1:
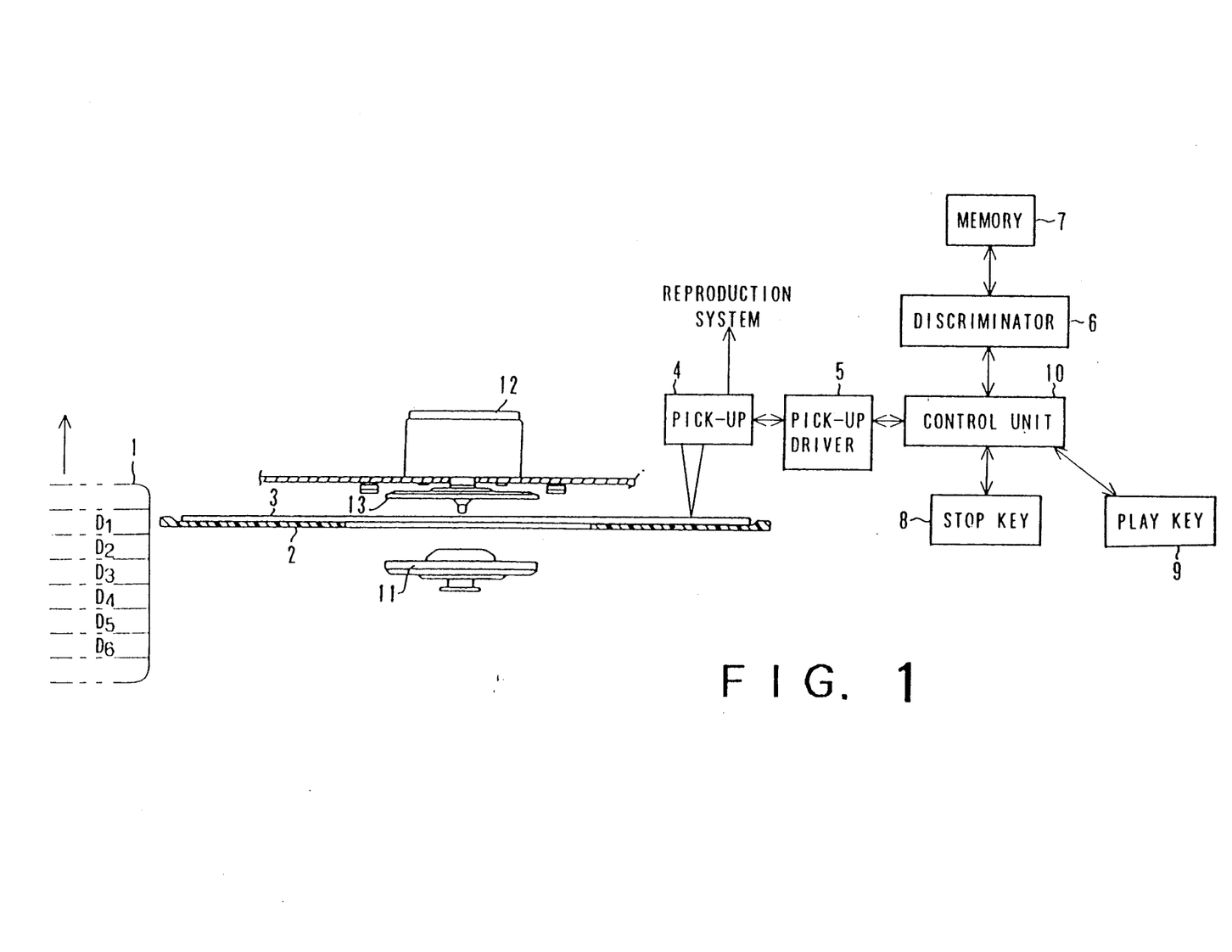
FIG. 1 is a schematic diagram for showing a control system for a multifunction CD player according to the present invention.

Referring to FIG. 1, the multifunction CD player has a magazine 1 which has six spaces D1 to D6 for containing six disks. The magazine 1 is located at the lower most position for selecting a first CD and means is provided for moving the magazine 1 in the upward direction as shown by an arrow for selecting other disks. A compact disk 3 is mounted on a tray 2 and drawn from the magazine 1 to a playing position shown in FIG. 1 together with the tray by shifting means (not shown).

A clamper 11 is provided for upwardly moving the disk 3 and for pushing the disk 3 against a turn table 13 to clamp it. A spindle motor 12 is provided for turning the turn table 13.

The CD player has a pick-up 4, a pick-up driver 5 for moving the pick-up 4, a discriminator or a reader 6 for reading data about the playing CD or for discriminating the vertical position of the magazine 1 which represents an identification number (1st to 6th) of the selected CD, a memory 7 for storing the identification number discriminated at the discriminator 6, a stop key 8 for stopping the CD player playing, and a play key 9 for starting the CD player to start the reproduction of a selected CD. A control unit 10 is provided for controlling various components of the player in accordance with the operations of the stop key 8, play key 9, etc.

Figure 2:
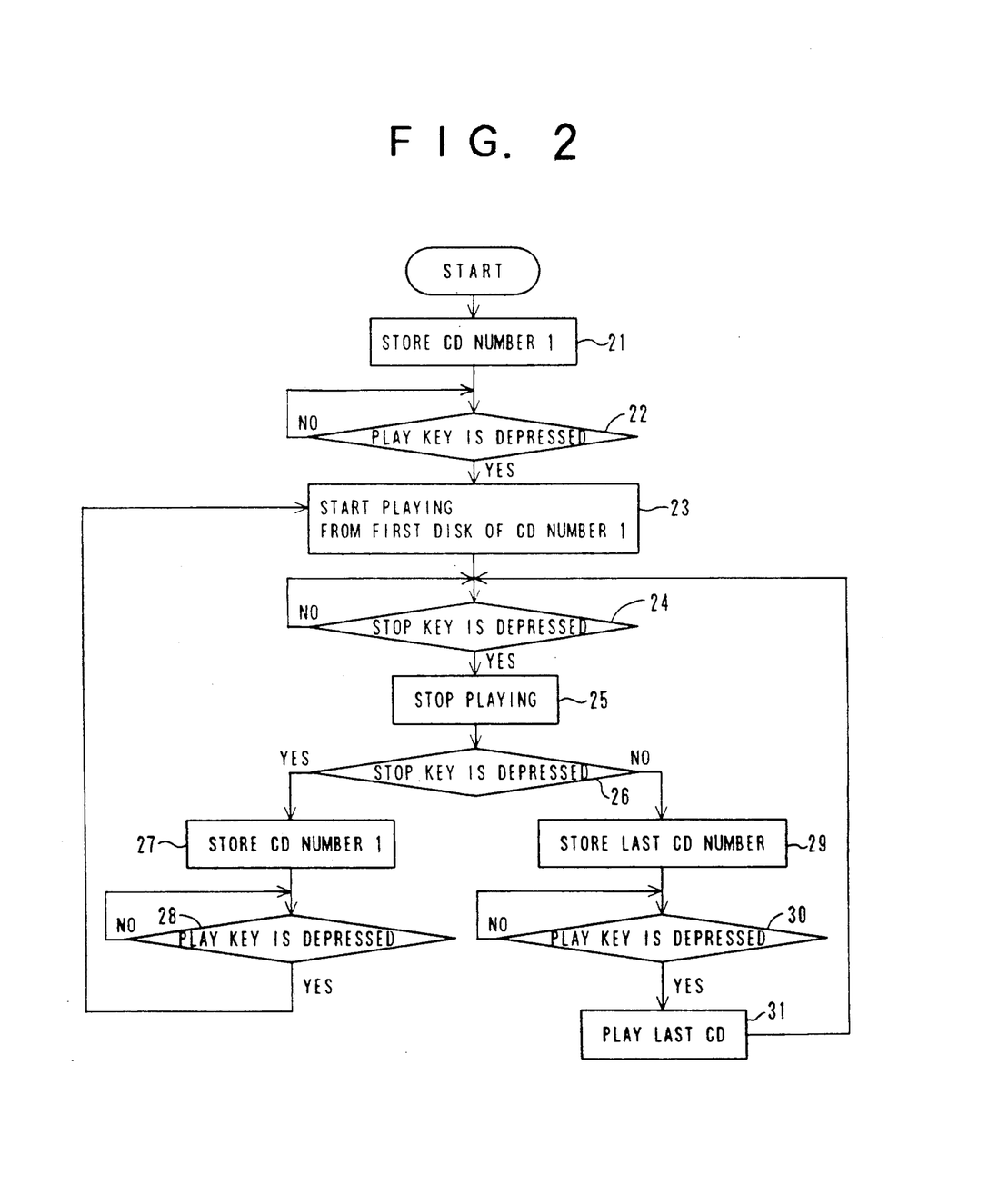
FIG. 2 is a flowchart showing the operation of the control system of FIG. 1.

The operation of the system is described hereinafter with reference to FIG. 2. When the magazine 1 is set in the player, the discriminator 6 detects the vertical position of the magazine 1. If a particular disk is not selected, the magazine 1 is located at the lower most position for the first CD in the first space D1, and hence the discriminator 6 detects the CD identification number (hereinafter called CD number) "1" which is stored in the memory 7 (step 21). At a step 22, the program waits the depression of the play key 9. When the play key is depressed, the control unit operates to drive the pick-up 4 so that the reproduction of the CD from the first disk of the CD number "1" is started (step 23). Thereafter, when the stop key 8 is depressed (step 24), spindle motor 12 stops and the pick up operation of the pick-up stops (25). At a step 26, it is determined whether the stop key 8 is re-depressed. When the stop key is re-depressed, the program proceeds to a step 27. At the step 27, the disk which has been played is returned to the magazine, and the magazine is returned to the initial lower most position, so that the CD number "1" of the first disk is stored in the memory 7. At a step 28, when the play key 9 is depressed, the reproduction of the first disk is performed (step 23).

If it is determined that the stop key 8 is not re-depressed at the step 26 for a predetermined time, the program goes to a step 29 where the discriminator 6 detects the CD number of the last disk and the detected CD number is stored in the memory 7. When the play key 9 is depressed (step 30), the CD number stored in the memory 7 is read and the pick-up 4 and the motor 12 are operated to perform the reproduction of the last disk (step 31).

Namely, if the play key is re-depressed after depressing the stop key, the first disk is played, and if the play key is depressed without re-depressing the stop key, the last disk is played. Thus, the repeat playing of the same disk can be avoided by the simple operation of the play key.

Figure 3:
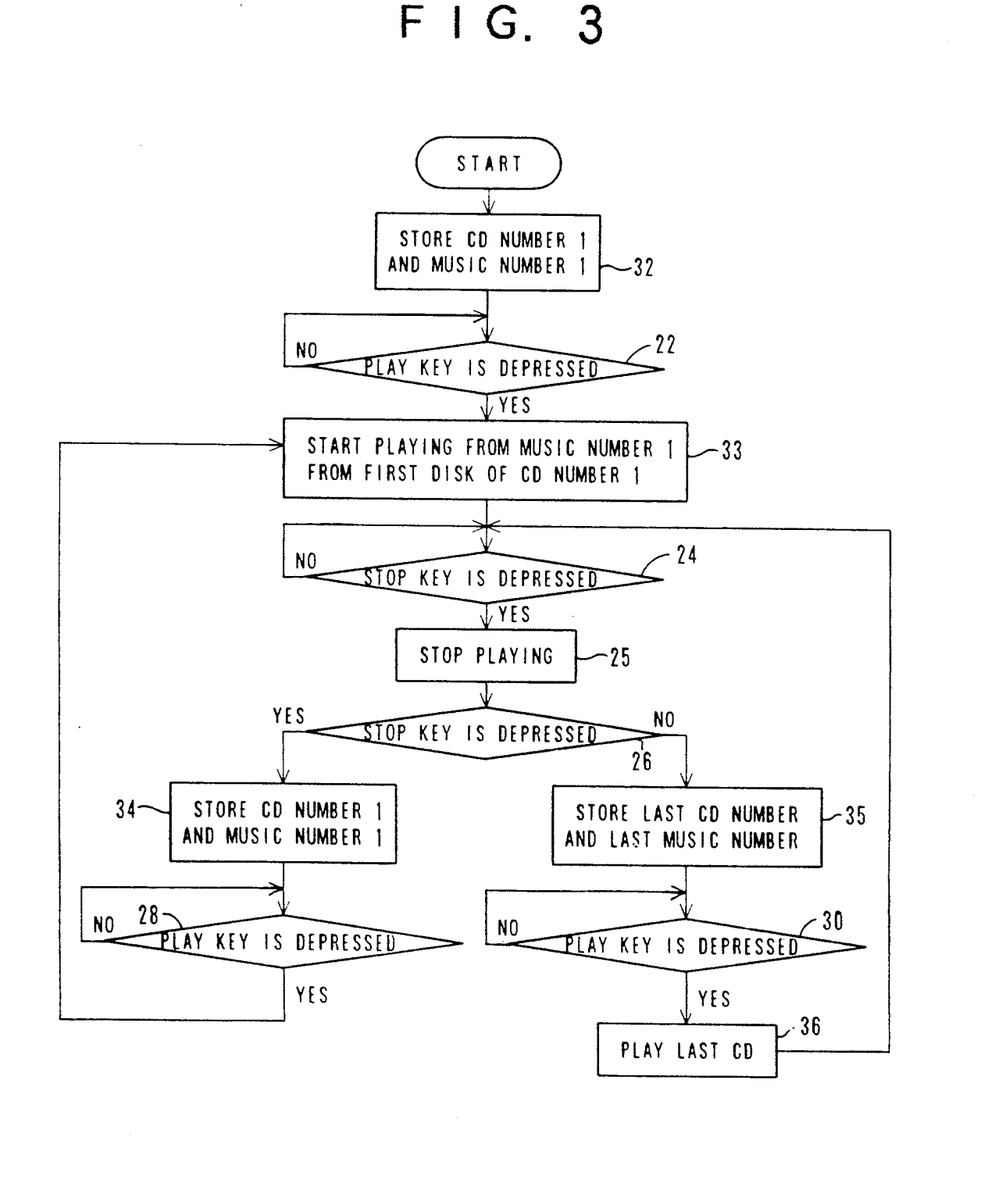
FIG. 3 is a flowchart showing operation of a second embodiment of the present invention.

FIG. 3 shows the second embodiment of the present invention. The system is characterized in that the music is designated. Namely, at steps 32, 33, 34, 35 and 36, music is specified. Therefore, the last music is played without repeating the first music of the first disk when the play key is re-depressed.

Figure 4:
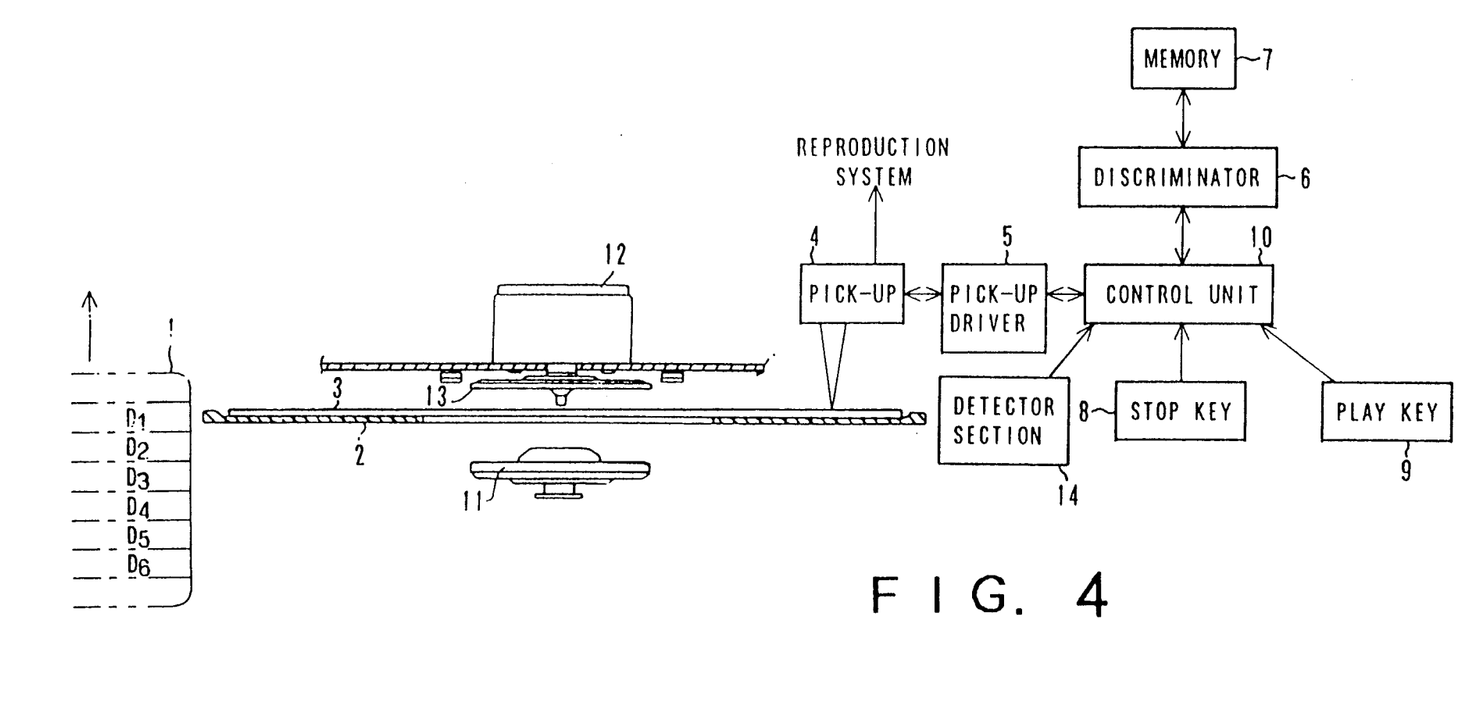
FIG. 4 is a schematic diagram showing a third embodiment of the present invention.

FIG. 4 shows the third embodiment of the present invention. The same parts as FIG. 1 are identified with the same reference numerals as the figure. The system has a detector section 14 for detecting the setting and removing of the magazine from the CD player, which compriser a photo sensor, a relay switch and others.

Figure 5:
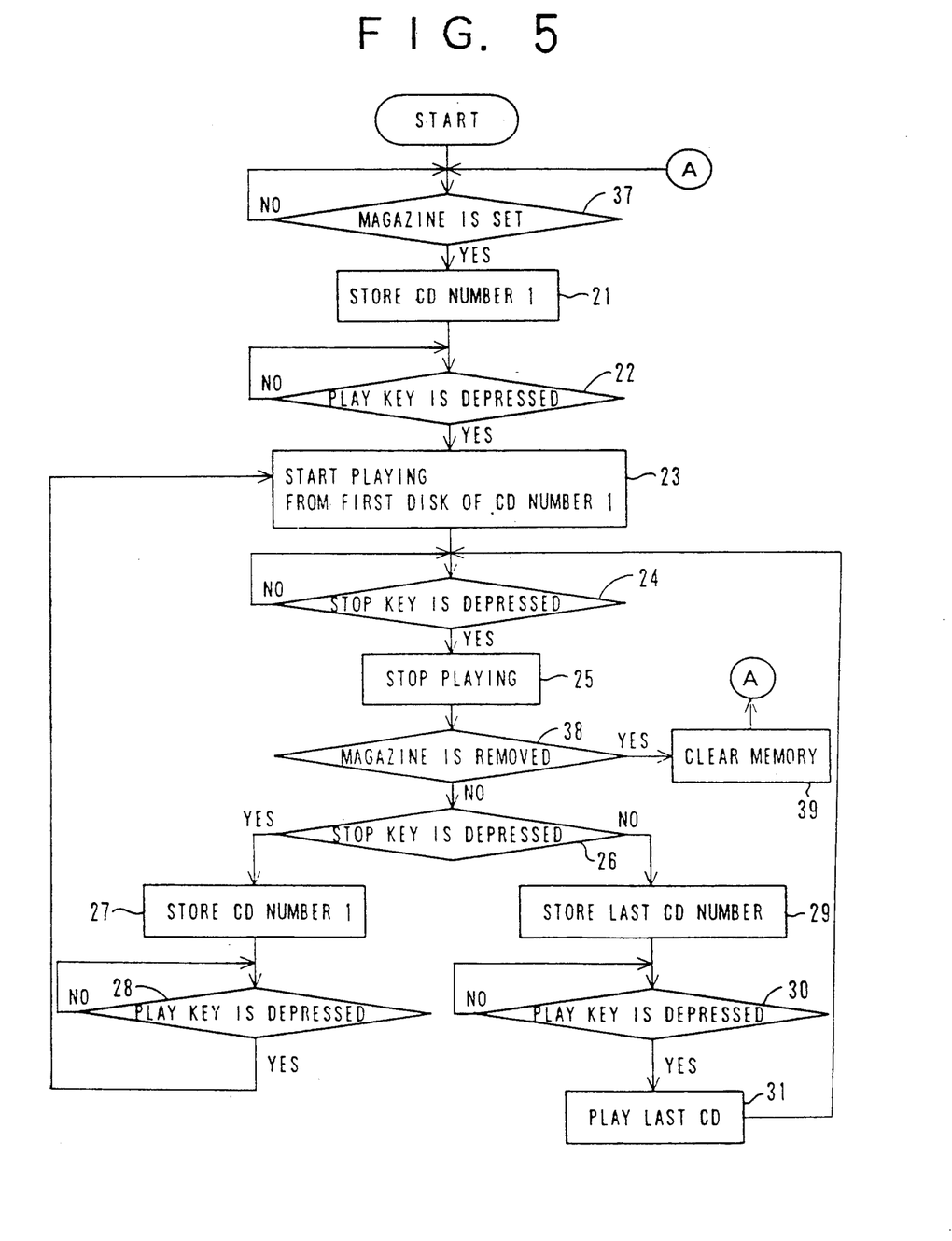
FIG. 5 is a flowchart of the control system of FIG. 4.

FIG. 5 shows the operation of the system. At a step 37, it is determined whether the magazine is set. When the setting of the magazine is determined, the CD number 1 is stored in the memory 7 at the step 21. When the play key is depressed, the first disk is played (steps 22, 23). Thereafter, when the stop key 8 is depressed (step 24), the player stops playing (25).

At a step 38, it is determined whether the magazine is removed or not. When the magazine is removed, the memory 7 is cleared at a step 39 to erase data therein. When the magazine is not removed, the program proceeds to a step 26 where it is determined whether the stop key 8 is re-depressed. When the stop key is re-depressed, the program proceeds to a step 27. At the step 27, the CD number "1" of the first disk is stored in the memory 7. When the play key 9 is depressed (step 28) the first disk is played (step 23).

If it is determined that the stop key 8 is not re-depressed at the step 26, the discriminator 6 detects the CD number of the last disk and the detected CD number is stored in the memory 7 (step 29). When the play key 9 is depressed (step 30), the last disk is played.

From the foregoing it will be understood that since data in the memory are cleared at every removal of the magazine, it is possible to use a memory having a small capacity.

Figure 6:
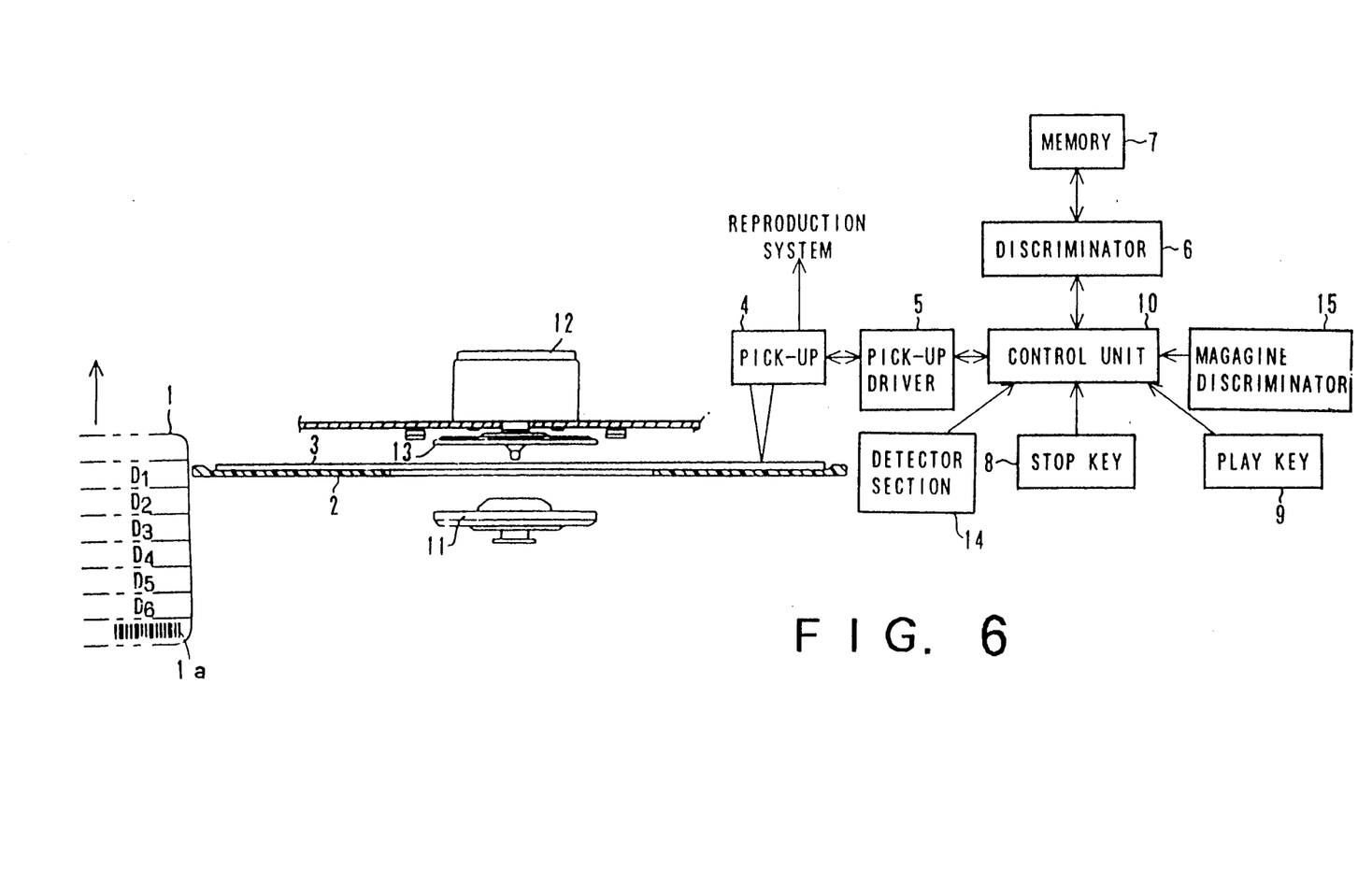
FIG. 6 is a schematic diagram showing a fourth embodiment of the present invention.

FIG. 6 shows the fourth embodiment of the present invention. The system has a magazine identification data reading section 15 for reading an identification bar code 1a on the magazine 1 to identify the magazine.

Figure 7A:
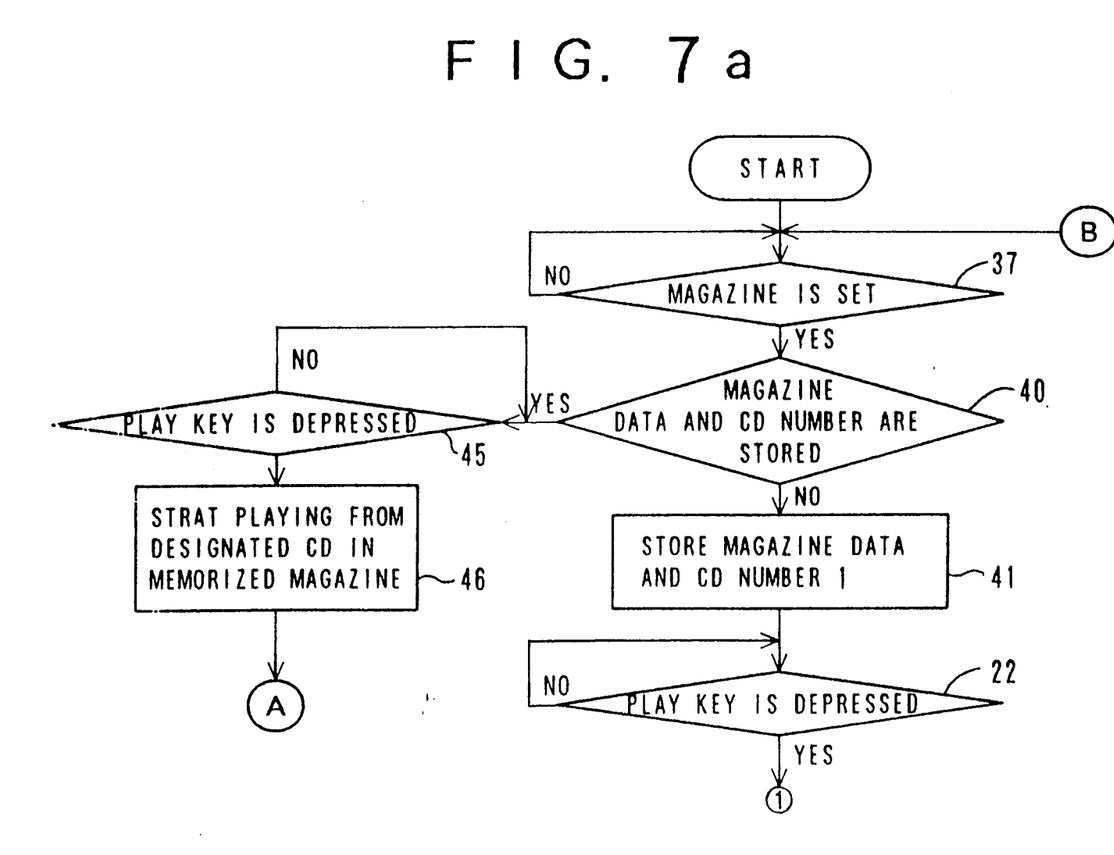
FIGS. 7a and 7b show a flowchart of the control system of FIG. 6.
Figure 7B:
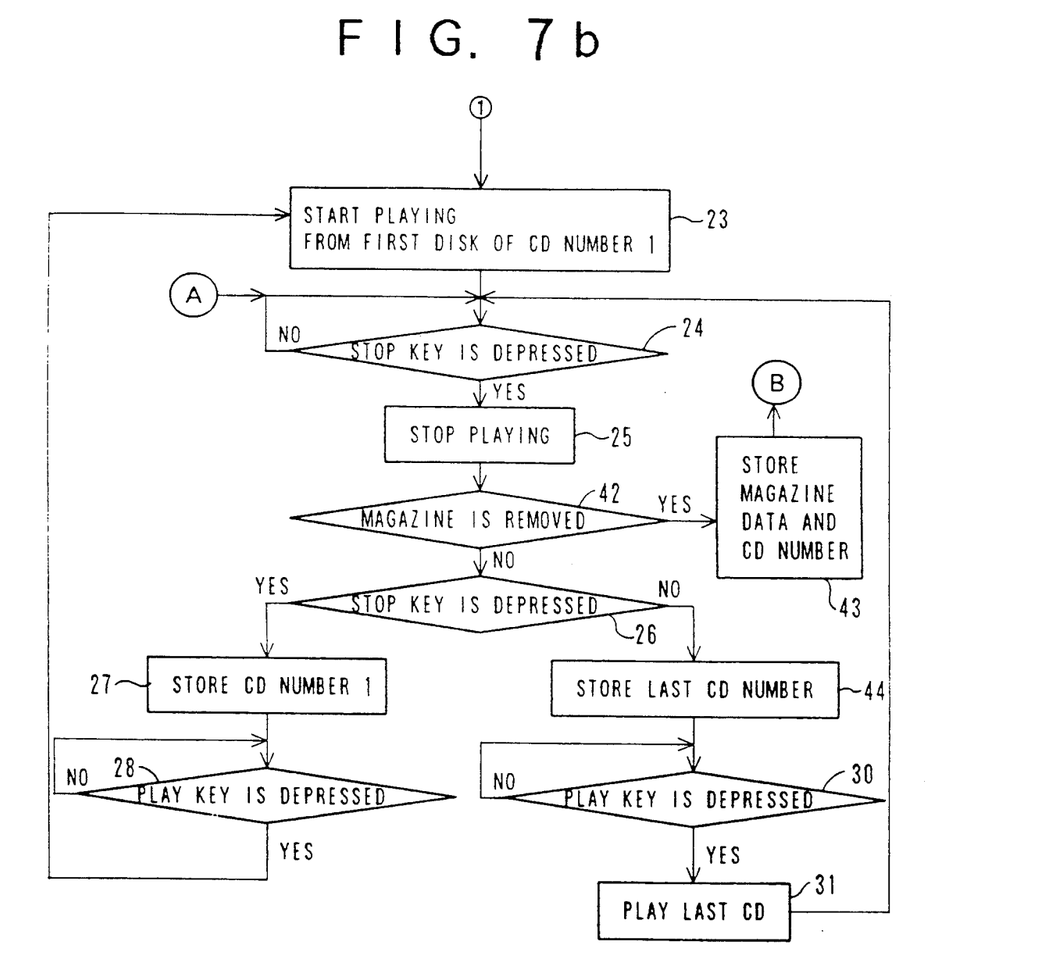

Referring to FIGS. 7a and 7b, when the magazine 1 is set in the CD player the identification bar code 1a is read out by the reading section 15. At a step 40, it is determined whether the identification bar code of magazine and CD number of the magazine have been stored in the memory 7 (step 40). If the answer is no, the bar code and the CD number 1 are stored at a step 41.

The operation from the step 22 to the step 25 is the same as the first embodiment. If the magazine 1 is not removed (step 42) and the stop key is re-depressed (step 26), the operation of the steps 28 and 23 is performed. When the magazine is removed (step 42), the identification data of the magazine and the CD number are stored at a step 43, which will be read out at the next time setting of the magazine. If the stop key is not re-depressed at step 26, the last CD number of the magazine at the stopping of the playing is stored at a step 44, and the last CD is played (step 31).

When it is determined that the magazine identification data and CD number are stored in the memory 7 at the step 40, the program proceeds to a step 46 through a step 45. At the step 46, the reproduction is started from a designated CD in the magazine stored in the memory 7 is played.

Since, in the fourth embodiment, the magazine identification data and the CD number at the stopping of the playing are memorized in the memory, the repetition of playing the same CD is avoided even if the magazine is changed to another one.

Although the bar code is provided for identifying the magazine in the above embodiment, data in the TOC (table of contents) area provided on the CD are used for this purpose. Furthermore, although the last CD is played at the next time play, the system can be arranged such that a music next to the last music is played.

Figure 8:
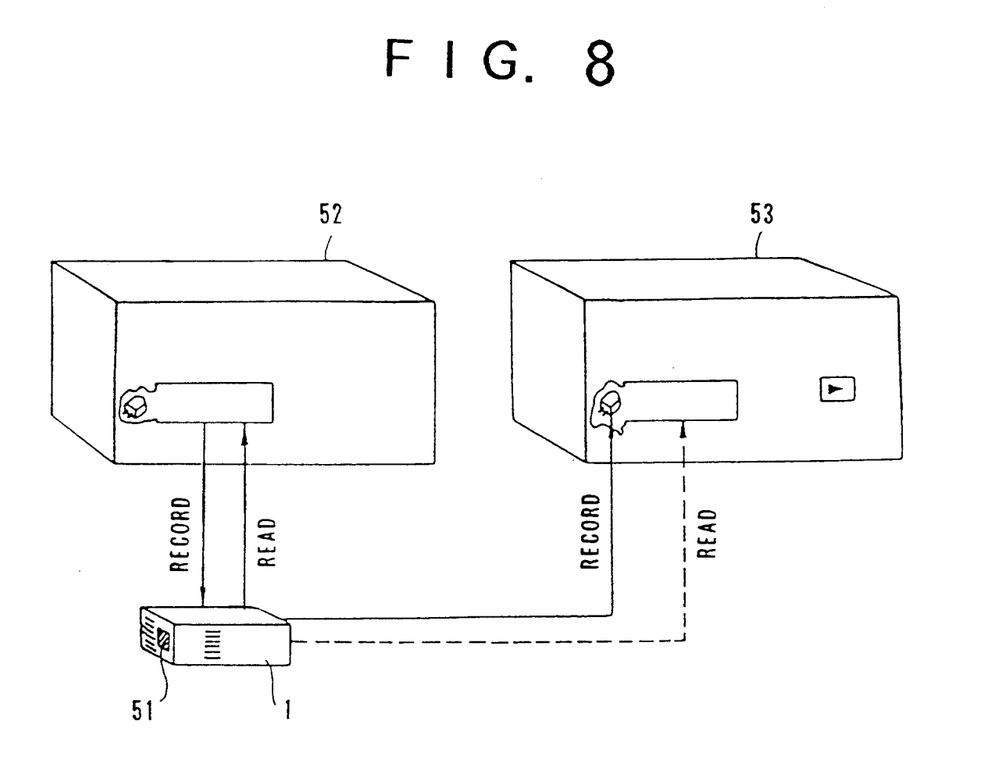
FIG. 8 is a perspective view diagrammatically showing the use of a magazine in a fifth embodiment.
Figure 9A:
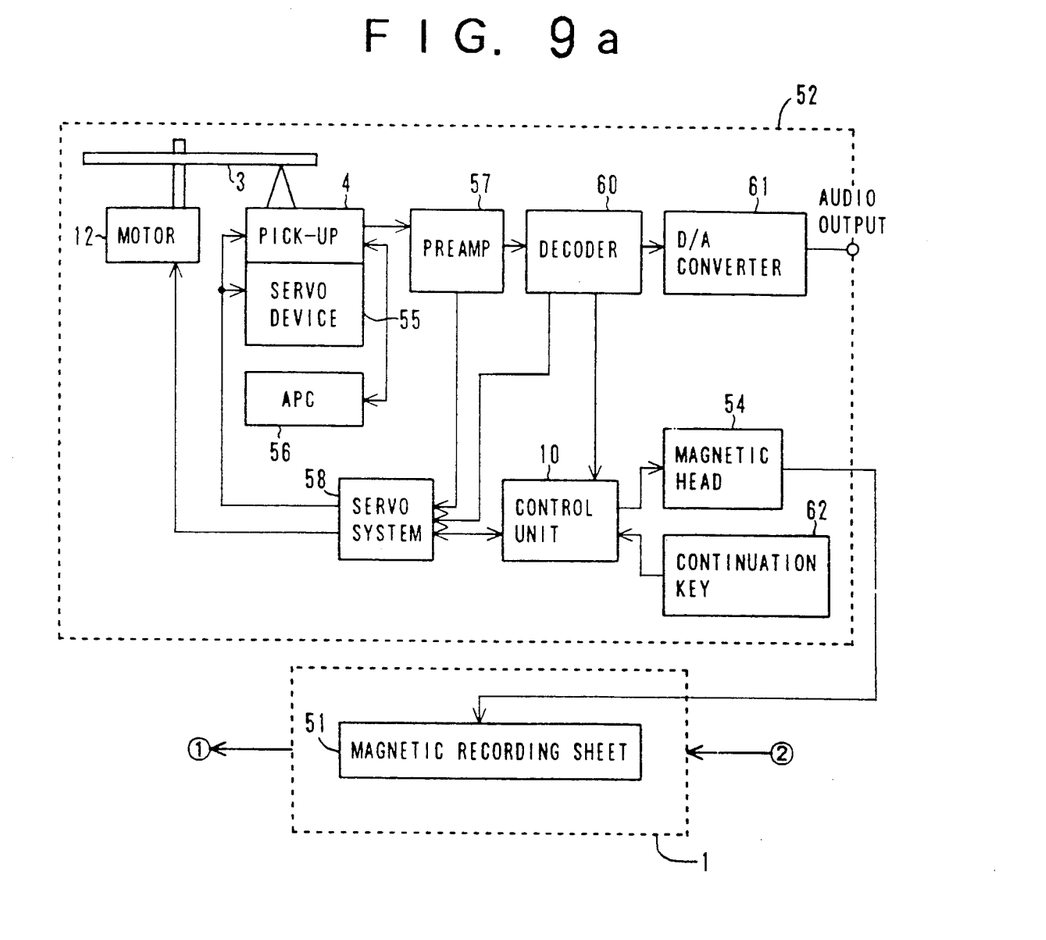
FIGS. 9a and 9b show a block diagram of a system of the fifth embodiment.
Figure 9B:
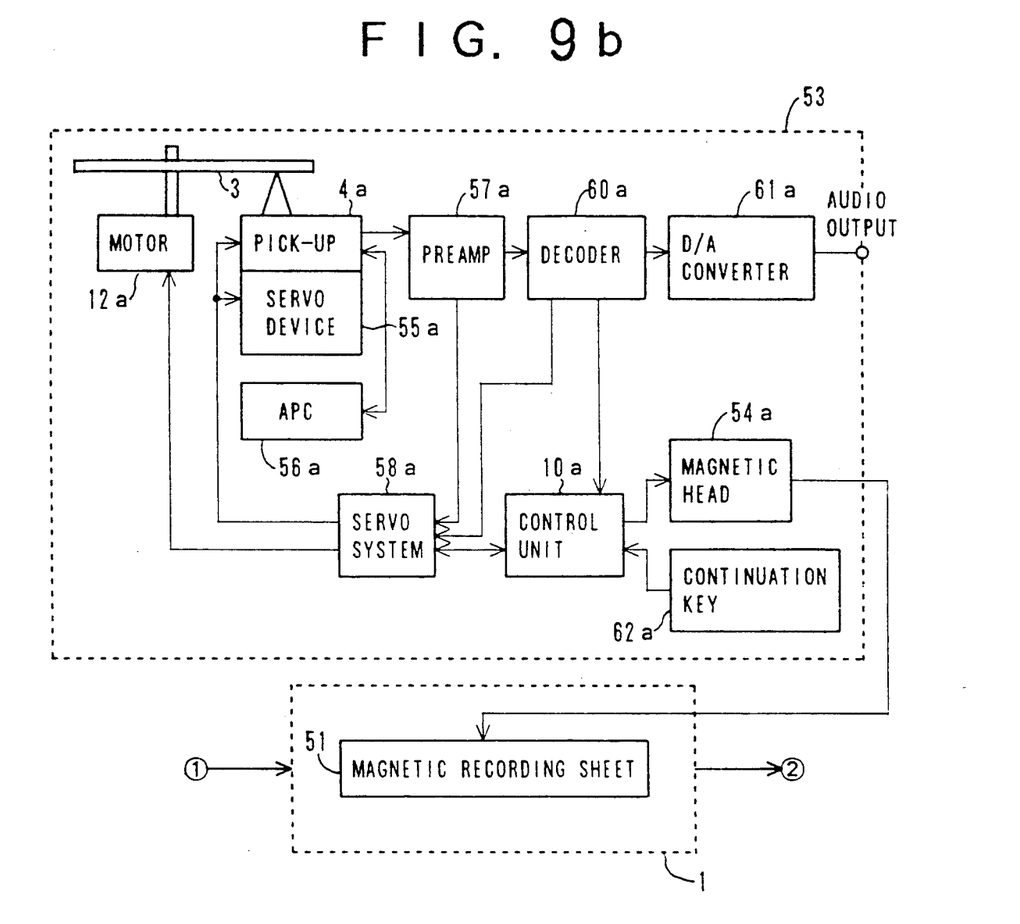

Referring to FIGS. 8, 9a and 9b, the magazine has a magnetic recording sheet 51 stuck on the side thereof for recording a CD number and a track number or an address of the disk at the stop thereof. A home CD player 52 and a car CD player 53 have magnetic heads 54 and 54a, respectively. Each of the magnetic heads 54 and 54a is provided for recording and reading signals on the magnetic recording sheet 51.

FIGS. 9a and 9b show the compositions of the home CD player 52 and the car CD player 53 according to the fifth embodiment of the present invention. Since the composition of the car CD player 53 is similar to the home CD player 52, a description of the home CD player will suffice, duplicate reference characters being used with a character a to identify similar parts.

The CD player 52 is provided with a servo device 55, an automatic phase control (AP) 56 for adjusting the phase difference at reading the signal on the magnetic recording sheet 51, a preamplifier 57 for amplifying the audio signal from the pick-up 4 and for deriving an error signal, and a servo system 58 for applying control signals to the spindle motor 12, pick-up 4 and servo device 55 in accordance with the error signal.

Furthermore, the CD player 52 has a decoder 60 for decoding the audio signal amplified by the preamplifier 57, a D/A converter 61 for converting the audio signal amplified by the preamp 57 to an analog audio signal, and a continuation key 62 in addition to the stop key 8 and play key 9. Other composition is the same as the previous embodiments.

Figure 10:
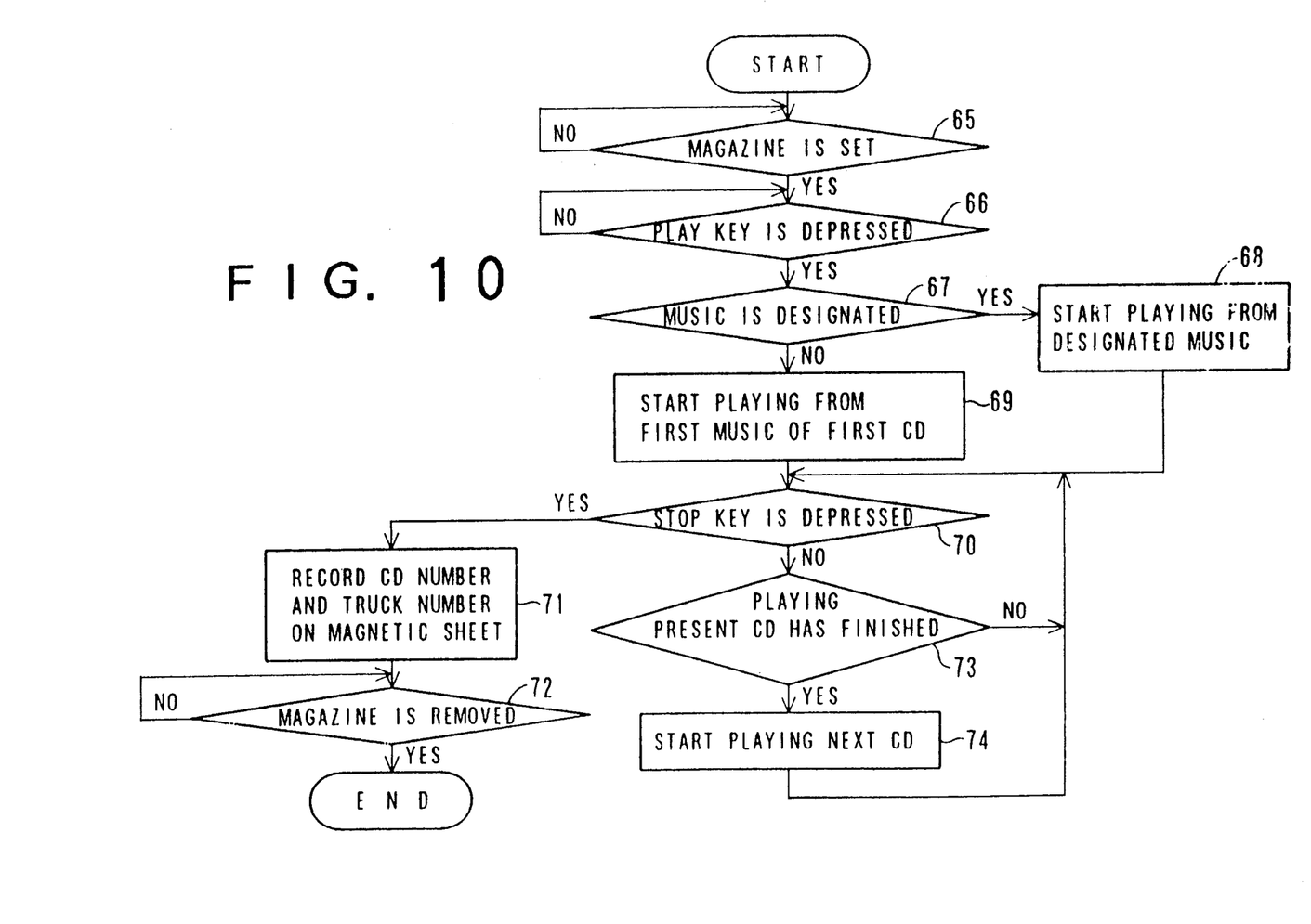
FIGS. 10, 11a and 11b are flowcharts showing operations of the system.
Figure 11A:
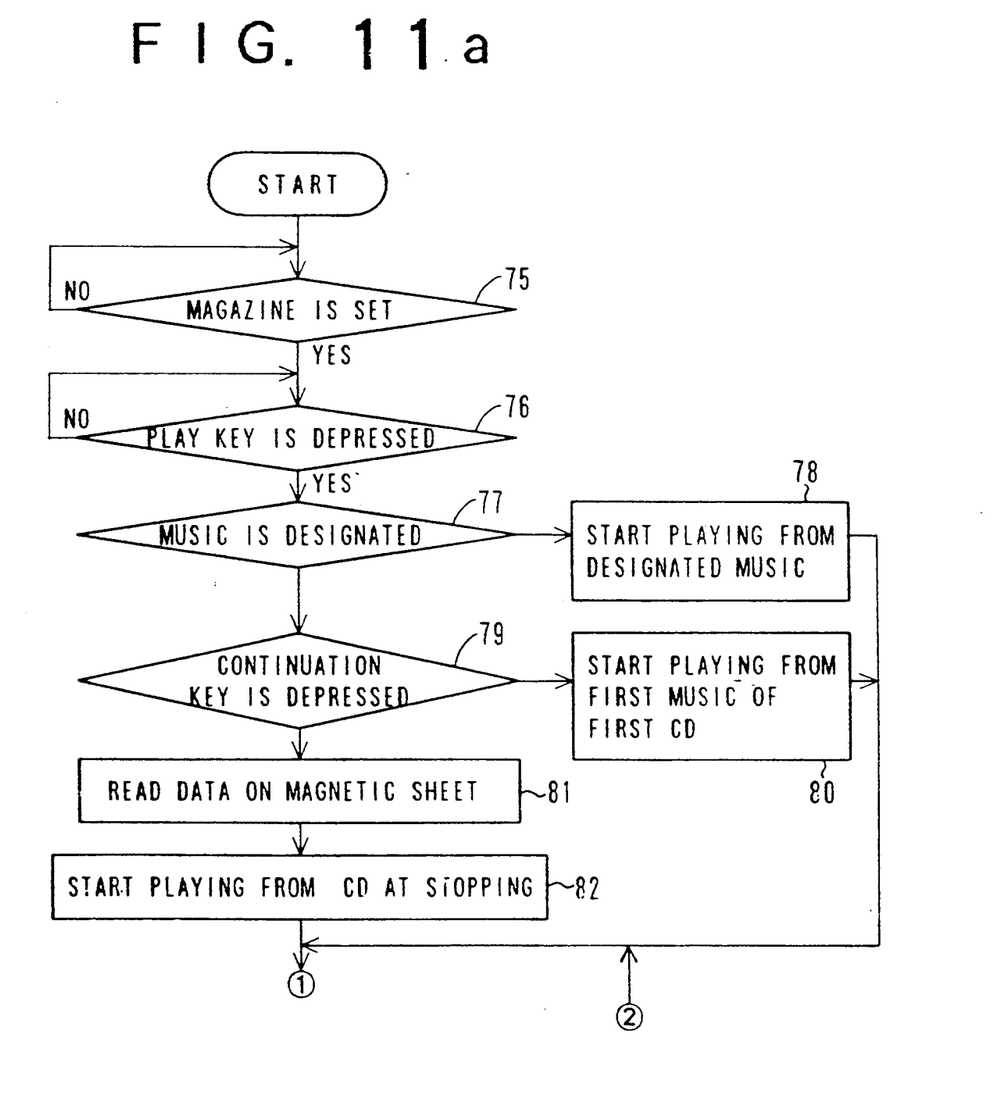
Figure 11B:
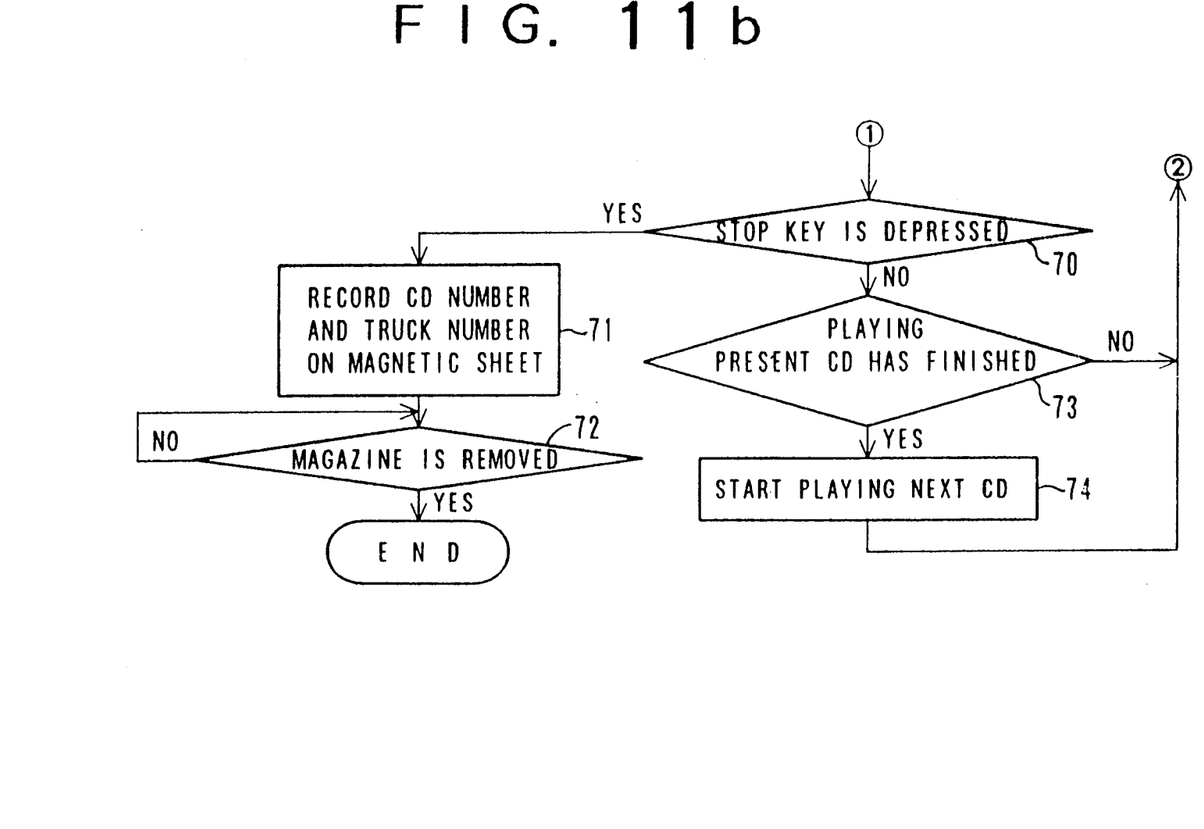

The operation of the system is described with reference to FIGS. 10, 11a and 11b. At first, no data are recorded on the magnetic recording sheet 51. When the magazine 1 is set in the home CD player 52 or in the car CD player 53 and the play key 9 is depressed (steps 65, 66), it is determined whether a specific music in a CD (CD number or address) is designated by operating the ten-key of the player at a step 67. When a specific music is designated, the reproduction of the CD starts from the designated music at a step 68. If not, the first music of the first CD is played (step 69). Thereafter, when it is determined that the stop key is depressed at a step 70, the CD number and the track number or address at the stopping of the playing are recorded on the magnetic tape (step 71). At a step 72, it is determined that the magazine is taken out from the home CD player or car CD player.

When it is determined that the stop key is not depressed at the step 70 and that the playing of the present CD has finished (step 73), the next CD is played (step 74).

The operation of the reproduction in accordance with the data on the magnetic sheet 51 is described with reference to FIGS. 11a and 11b. When the magazine 1 the CD of which has been played by the home CD player 52 or by the car CD player 53 is set in the car CD player 53 or in the home CD player 52 and the play key is depressed (steps 75, 76), it is determined whether a specific music is designated at a step 77. If the answer is YES, the designated music is played at a step 78. If not, it is determined whether the continuation key 62a or 62 is depressed at a step 79. If the continuation key is not depressed, the first music of the first CD is played (step 80). If the key is depressed, the data on the magnetic sheet 51 which has been recorded at the previous playing by the other player or the same player is read out (step 81) and the reproduction starts from the last CD which has been played and designated by the read out data. Thereafter, program at steps 70 to 74 is performed in the same manner as the program of FIG. 10.

Although in the described fifth embodiment the continuation key is provided for continuing the playing, the system may be arranged such that the continuous playing is performed by depressing twice the play key as described above with the previous embodiments.

The magnetic recording sheet may be substituted with a mechanical or electrical, or optical recording medium.

While the presently preferred embodiments of the present invention have been shown and described, it is to be understood that these disclosures are for the purpose of illustration and that various changes and modifications may be made without departing from scope of the invention as set forth in the appended claims.

What is claimed is:

1. A control system for a compact disk player having a magazine containing a plurality of disks and operating keys including a play key for playing a disk and a stop key for stopping the playing of said disk, the control system comprising:
   detector means, responsive to operation of the stop key, for detecting an identification of a last disk which has been played immediately before operation of the stop key;
   memory means for storing the detected identification of the last disk;
   determining means for determining if the play key has been operated after the operation of the stop key;
   reading means, responsive to the determining means, for reading the identification stored in the memory means when only the play key is operated after operation of the stop key; and
   playing means, responsive to the read out identification from the reading means, for replaying the last disk in accordance with the identification from the reading means therein enabling repeated playing of the last disk when only said play key is operated after operation of the stop key.

2. The system according to claim 1 wherein
   the identification includes data for the magazine, a CD number and a music number.

3. The system according to claim 1 further comprising a magazine identification provided on the magazine, and said detector means including detecting means for detecting the magazine identification of a last magazine.

4. The system according to claim 1 further comprising clear means for clearing the memory means when the magazine is removed from the compact disk player.

5. The system according to claim 3 wherein the magazine identification is a bar code provided on the magazine for identifying the magazine, and the detecting means is arranged to read the bar code.

6. The system according to claim 1 wherein
   the memory means is provided on the magazine.

7. The system according to claim 6 further comprising recording means for recording data on a magnetic recording sheet when the magazine is removed from the compact disk player.

8. The system according to claim 7, wherein
   the memory means is the magnetic recording sheet attached to the magazine and the reading means and the recording means is formed by a magnetic head for recording the identification data on the magnetic recording sheet and for reading the recorded data.

* * * * *

UNITED STATES PATENT AND TRADEMARK OFFICE
CERTIFICATE OF CORRECTION

PATENT NO. : 5,189,656
DATED : February 23, 1993
INVENTOR(S) : Naoki Masaki et al It is certified that error appears in the above-indentified patent and that said Letters Patent is hereby corrected as shown below:

On title page, item [63], change "518,925" to --578,925--

Signed and Sealed this

Seventh Day of December, 1993

*Attest:*

BRUCE LEHMAN

*Attesting Officer*     *Commissioner of Patents and Trademarks*